No. 610,509. Patented Sept. 6, 1898.
H. WILLIAMS.
MEANS FOR CONTROLLING VOLTAGE AND VOLUME OF ELECTRICAL CURRENTS.
(Application filed Dec. 8, 1897.)
(No Model.)
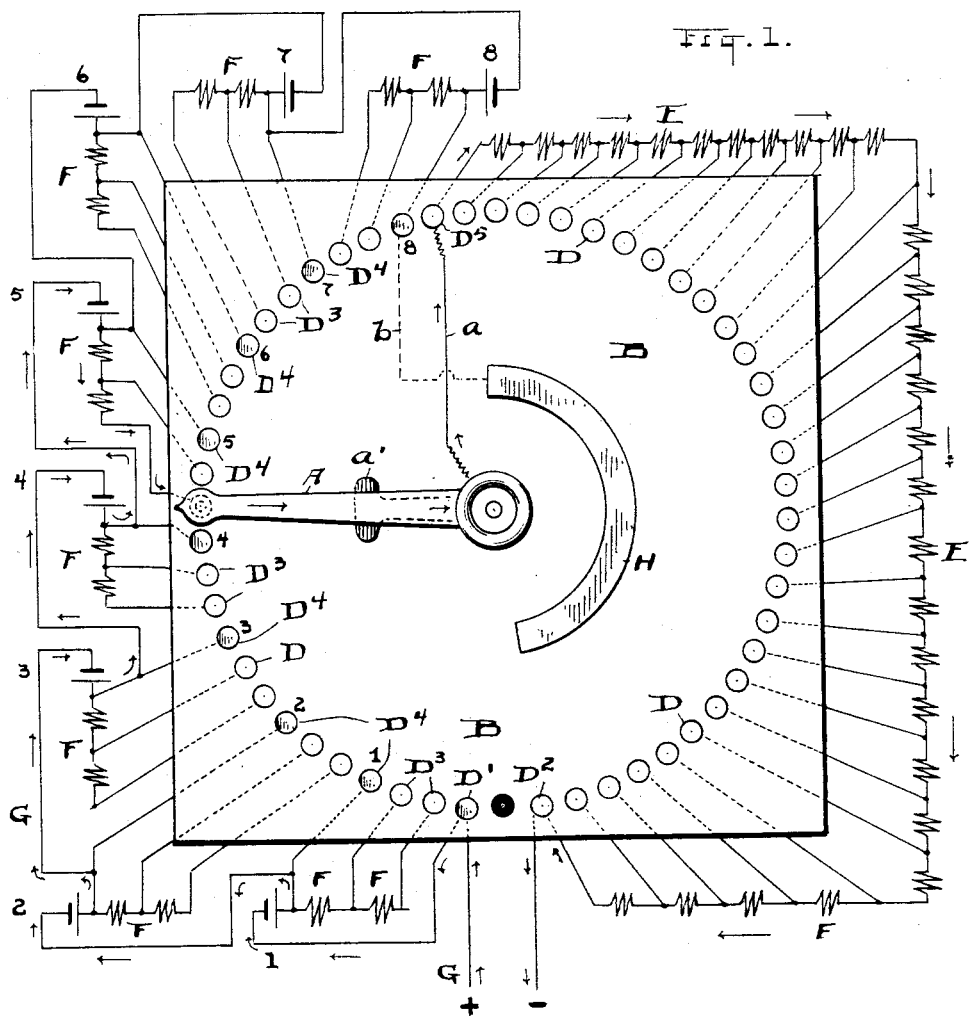
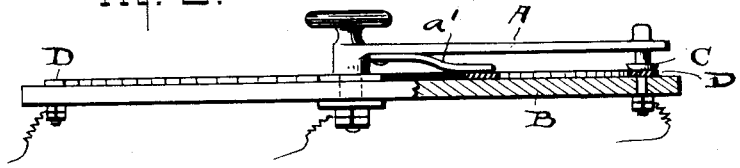
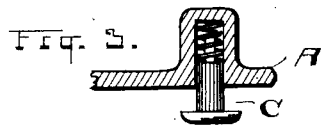
ATTEST
INVENTOR.
Harry Williams
By H. F. Fisher ATTY

UNITED STATES PATENT OFFICE.

HARRY WILLIAMS, OF CLEVELAND, OHIO, ASSIGNOR TO THE MORRISON BATTERY COMPANY, OF SAME PLACE.

MEANS FOR CONTROLLING VOLTAGE AND VOLUME OF ELECTRICAL CURRENTS.

SPECIFICATION forming part of Letters Patent No. 610,509, dated September 6, 1898.

Application filed December 8, 1897. Serial No. 661,135. (No model.)

*To all whom it may concern:*

Be it known that I, HARRY WILLIAMS, a citizen of the United States, residing at Cleveland, in the county of Cuyahoga and State of Ohio, have invented certain new and useful Improvements in Means for Controlling the Voltage and Volume of Electrical Currents; and I do declare that the following is a full, clear, and exact description of the invention, which will enable others skilled in the art to which it appertains to make and use the same.

My invention relates to means for controlling the voltage and volume of an electrical current; and the improvement consists in the new and novel arrangement of parts, substantially as shown and described and more particularly pointed out in the claims.

The invention is designed to be used more especially in connection with dentistry and other like arts where a steady and even electrical current is desired; and the object of this invention is to provide a simple and efficient means whereby a steady and uniform current can be obtained, while increasing the voltage and volume of the same. I obtain this result by my construction and arrangement of parts and so overcome the objectional and unpleasant shocks due to an uneven flow of the current as met with in the ordinary devices for increasing an electrical current.

In the accompanying drawings, Figure 1 is a plan view of a switchboard with its electrical connections diagramatically arranged around the same. Fig. 2 is an edge elevation. Fig. 3 is a cross-section of the end of the switch.

A represents a switch pivotally mounted in the center of a non-conducting switchboard B, and this switch is provided at its outer end with a spring-pressed plunger C, which makes an electrical connection with the contacts D when the switch is rotated to any point on the circularly-arranged contacts. These contacts are insulated from each other, and the first contact $D'$ and the last contact $D^2$ are connected direct to the line or to the instruments being used. Eight cells of batteries are shown connected in series to the contacts at the left of the first contact $D'$, though more or less cells might be used if so desired, and then the balance of the contacts from the last cell to the last contact $D^2$ connect resistance-coils E in series to each contact D. The number of these coils and contacts can be increased or decreased as desired, the amount of resistance required being determined by the number of cells used. As each resistance-coil is cut out a slight increase of current is added to the line until the switch reaches the last contact-point $D^2$, where all the resistance is cut out and the total amount of current is free to pass over the line; but it has been found that where cells are connected in series and the current held in check by resistance-coils when each cell is added the amount of that one cell is too great to cause an even and steady increase of current even though the amount of current added passes through a great amount of resistance. This causes a fluctuation of the current, and it is due to this disturbed state of current that gives the shocking sensations to the patient, and to obviate this objection I employ resistances F on the line between each cell and connect each resistance to contacts $D^3$, located between the battery-contacts $D^4$. This enables me to divide the voltage of each cell into as many degrees as I may wish, and by consecutively cutting out each resistance F, I allow the full amount of that one cell to be gradually added to the line.

As shown in Fig. 1, the switch A is on the first contact $D^4$ of battery 5, and starting from the line G the course of the current can be followed by the arrows, which indicate that the currents from the cells 1, 2, 3, and 4 are fully on the line and with part of the current from cell 5 on the line, the resistances F being interposed between the cell 5 and contact $D^4$, upon which the switch rests. The current passes through switch A to a wire $a$, which connects to the first of the contacts of the resistance-coils E, and as these coils are arranged in series the total amount of current must pass through all the coils to contact $D^2$ and over the line. When the switch reaches the last contact D of the last cell 8, the plunger C of switch A passes to the first contact $D^5$ of the resistance-coils E, and as the current from the combined cells must remain in circuit a contact-plate H is connected to the last contact D of cell 8 by wire $b$, and the switch A is provided with a spring contact-arm $a'$, and this arm comes into contact with plate H when the plunger C leaves the last battery-contact to pass over to the resistance-contacts, and the plate H is of such length as to keep the cells in circuit until the last contact $D^2$ is reached. When the switch is on this contact $D^2$, all resistance is cut out, and the patient receives the full amount of current from the eight cells. In practice the switch is rotated to any radius of the circle of contacts, and when the patient receives the amount of current desired by the operator the switch is left on that contact until the operator has finished and wishes to cut off the current, which he can do by reversing the switch until contact $D'$ is reached.

The operation is simple, and its simplicity lies in the construction of a single rotating switch, which first switches in the cells and then cuts out the resistances by a further rotary movement of the same switch, the plate H keeping the current from all the cells on the line while the resistance-coils are being consecutively cut out.

What I claim is—

1. In an electrical apparatus, a series of cells and resistances interposed between the cells and a line of separate resistances in the circuit beyond the cells, and a switch constructed and arranged to first travel over said cells and lastly over the outside resistances, substantially as described.

2. In an apparatus for controlling the voltage and volume of an electrical current, a series of cells and a series of resistances arranged consecutively and connected together, a series of contact-points for the cells and said resistances, and a series of resistances outside of the cells and on the circuit, and a switch, substantially as described.

3. In means for controlling an electrical current, a rotary switch, a series of contacts, the cells and resistances in series between the cells connected to said contacts, a second series of contacts and resistance-coils arranged in series connected thereto, and means to keep said cells in circuit when the switch is cutting out the said last resistance-coils, substantially as described.

4. In means for controlling an electrical current, a rotary switch, a series of contact-points arranged in consecutive order for said switch, the first series of said contacts being connected to a series of cells and a series of resistances on the line between said cells, and the balance of said contacts being connected to resistance-coils arranged in series, and means to electrically connect said cells and switch when the said last resistance-coils are being cut out, substantially as described.

5. In a rotary switch for controlling an electrical current, a series of contacts electrically connected to a series of cells and resistance-coils, a spring-pressed plunger in the outer end of said switch and bearing on said contacts, a plate electrically connected to the cells, and an arm on said switch constructed to come in working relation to said plate when the switch is rotated to cut out the resistances, substantially as described.

6. In means for controlling an electrical current, a rotary switch, A, a series of contacts, D, and cells connected in series to said contacts, a series of resistances F connected to said contacts and arranged on the line between said cells, a series of resistance-coils E connected to the contacts D after the last of the cell-contacts, and a plate H electrically connected to the cells and constructed to make a continuous contact with switch A while the coils E are being cut out, substantially as described.

Witness my hand to the foregoing specification this 14th day of June, 1897.

HARRY WILLIAMS.

Witnesses:
H. T. FISHER,
H. E. MUDRA.